July 6, 1948.  G. W. FYLER  2,444,771
HEIGHT COMPUTING APPARATUS
Filed June 28, 1943
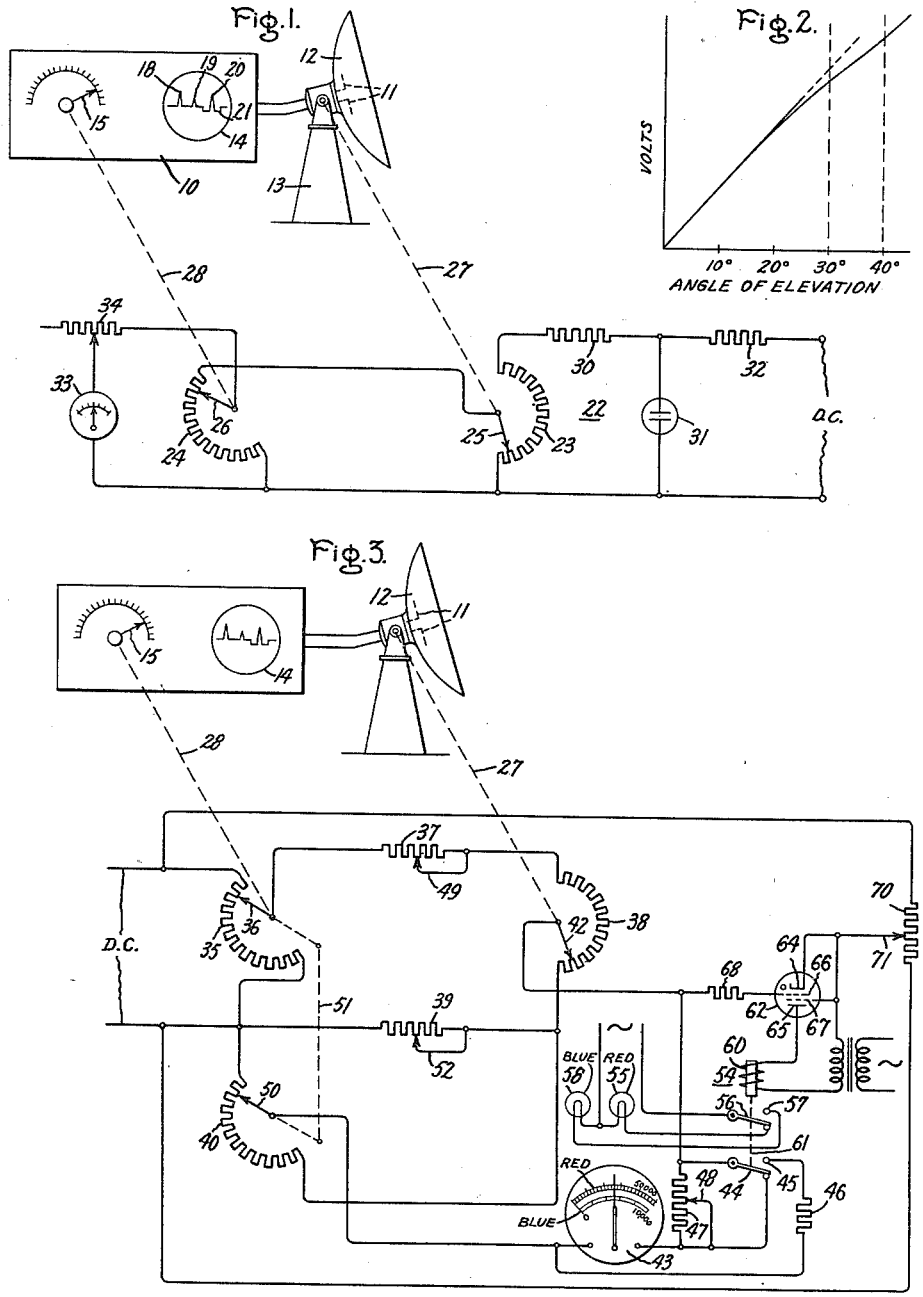
Inventor:
George W. Fyler,
by Harry E. Dunham
His Attorney.

Patented July 6, 1948

2,444,771

UNITED STATES PATENT OFFICE 2,444,771

HEIGHT COMPUTING APPARATUS

George W. Fyler, Stratford, Conn., assignor to General Electric Company, a corporation of New York Application June 28, 1943, Serial No. 492,500

8 Claims. (Cl. 235—61.5)

My invention relates to apparatus for computing values dependent upon the sines of angles and particularly to such apparatus which may be employed in connection with range finding devices for calculating and indicating the height of a distant object.

In the use of devices such as radio locating apparatus for determining the range and angle of elevation of distant objects, it is frequently desirable to provide a direct indication of the height of the distant object above the surface of the earth. Various computing devices are known for obtaining such information by mechanical arrangements. However, these devices are generally complicated and expensive, and it is desirable to provide a simpler form of apparatus to secure a direct reading within a predetermined degree of accuracy. Accordingly, it is an object of my invention to provide an improved apparatus for computing values dependent upon the sines of angles which shall require a minimum number of moving parts and shall directly indicate the desired value within a predetermined degree of accuracy.

It is another object of my invention to provide an improved apparatus for computing the height of a distant object by electrical means including linear resistance elements.

It is another object of my invention to provide an improved apparatus for computing the height of a distant object including a correction to account for the earth's curvature, the apparatus comprising electrical means including linear resistance elements.

A further object of my invention is to provide an improved apparatus including an indicating instrument having a plurality of scales and an automatic arrangement for preventing confusion and reading of values from the wrong scale.

A still further object of my invention is to provide an apparatus for computing the height of a distant object by electrical means and including an indicating instrument providing a plurality of scales and an arrangement for shifting from one scale to another automatically without changing the load in the portion of the electrical circuit in which the meter is connected.

The features of my invention which I believe to be novel are set forth with particularity in the appended claims. My invention itself, however, both as to its organization and method of operation together with further objects and advantages thereof may best be understood by reference to the following description taken in connection with the accompanying drawings in which Fig. 1 illustrates diagrammatically a range finding and height computing apparatus embodying my invention; Fig. 2 represents an operating characteristic of a portion of the apparatus of Fig. 1; and Fig. 3 illustrates another embodiment of my invention.

Referring now to the drawing, the range finding and height computing apparatus shown in Fig. 1 comprises a radio locator 10 including a dipole antenna 11 associated with a parabolic reflector 12 pivotally mounted on a pedestal 13. The locator 10 includes a cathode ray tube or electron discharge device 14 and an operating and indicating arm 15 which is positioned either manually or automatically in accordance with the range of a distant object as indicated by light traces on the fluorescent screen of the cathode ray tube 14. When the reflector 12 is pointed directly at a distant object the angle of elevation of the object is indicated by the angle between the central axis of the reflector and the horizontal. When high frequency pulses or series of pulses, reflected from or transmitted by distant objects, are impressed on the antenna 11, corresponding pulses or peaks 18, 19 and 20, for example, appear on the light trace of the cathode ray tube 14. By moving the range arm 15 to vary the control of the locator 10, an aperture or range pulse 21 is moved along the light trace of the tube 14. When the pulse 21 is centered with respect to one of the pulses 18, 19 and 20, for example, the pulse 20 as shown, the arm 15 indicates the range of the distant object from which the pulse 20 has been received. The scale for the pointer 15 may be calibrated directly in miles to indicate the range of the distant object.

The height of a distant object is equal to the product of its range and the sine of its angle of elevation. For great distances it may be necessary to include a correction required because of the curvature of the earth, this correction being added to the altitude of the object as determined by the range and the sine of the angle of elevation. In the apparatus shown in Fig. 1 the earth curvature correction is not included.

An altitude determining apparatus employing linear voltage dividers connected in a calculating circuit and including an arrangement for providing the earth curvature correction is disclosed and broadly claimed in my copending application, Serial No. 429,499, filed June 28, 1943, and assigned to the same assignee as my present application.

Referring again to Fig. 1, in order to compute the height or altitude of the distant object and to provide a direct reading which is available simultaneously with the reading of range and is preferably determined in feet rather than miles, I provide a calculating device 22. The device 22 includes two linear resistances 23 and 24 provided with rotatable contact arms 25 and 26, respectively. The arm 25 is coupled to the parabolic reflector assembly 12 by suitable means indicated by the dotted line 27 so that the contact arm 25 moves over the resistance 23 in accordance with the angle of elevation of the distant object toward which the reflector 12 is directed. The length of the resistance 23 is arranged to represent the full range of angles of elevation over which the anntenna 11 is to be moved. The arm 26 is directly coupled to the range arm 15 by a suitable coupling 28 so that the contact arm 26 moves over the resistance 24 in accordance with the range as indicated by the pointer 15, the maximum distance to be measured corresponding to the full length of the resistance 24.

The resistance 23 is connected in series with the resistance 30 across a suitable constant voltage source of direct current which is here represented by a voltage regulating electron discharge device 31 connected in series with a resistance 32 across a suitable source of direct current. The resistance 24 is connected in shunt with a portion of the resistance 23, as determined by the position of the contact arm 25, so that the voltage across the resistance 24 is proportional to the voltage drop across the shunted portion of the resistance 23. An electrical indicating instrument such as a voltmeter 33 is connected in series with a calibrating resistance 34 across a portion of the resistance 24 between the lower end of the resistance and the contact arm 26 to provide an indication proportional to the voltage drop in the section of the resistance 24 shunted by the instrument 33.

It has been found that for angles of elevation up to the order of thirty degrees the voltage drop in the shunted portion of the resistance 23 may be made closely proportional to the sine of the angle of elevation when the contact arm 25 is in a position directly proportional to the angle. This is accomplished by making the resistance 30 about fifty per cent greater than the resistance 23 and by making the value of the resistance 24 of the order of four times the sum of the resistances 23 and 30.

It will, therefore, be apparent that since the voltage impressed across the resistance 24 is proportional to the sine of the angle of elevation, and since the portion of the resistance 24 which is shunted by the arm 26 is determined by the range of the object, the voltage drop across the shunted portion of the resistance 24 is proportional to the product of the range by sine of the angle of elevation. The instrument 33 may, therefore, be calibrated to indicate the height of the distant object in feet or in any other desired units.

As an example by way of illustration only and not by way of limitation, in one apparatus embodying my invention which was designed for the computing of the heights of distant objects up to angles of elevation of the order of thirty degrees, the resistance 23 constituted forty per cent of the sum of the resistances 23 and 30 shunted across the constant voltage source. The resistance 24, comprising a load resistance connected across the shunted portion of the resistance 23, was of a value approximately five times the sum of the resistances 23 and 30. The resistance of the instrument 33 was twenty times that of the resistance 24. The voltage of the direct current source was approximately 300 volts and the voltage regulator tube 31 maintained a constant voltage of 120 volts across the resistances 23 and 30 in series. In this apparatus a characteristic curve substantially as shown in Fig. 2 was obtained which represents the voltage drop in the shunted portion of the resistance 23 plotted against the angle of elevation. This characteristic follows a sine curve very closely up to an angle of elevation of thirty degrees. Thereafter, the curve, as determined by tests after shunting the whole of the resistance 23 and employing a suitable jumper to shunt a part of resistance 30 in addition, was found to vary considerably from a sine curve and, in fact, its angle of slope increased. The variable portion of the resistance shunted across the tube 31, that is, the portion 23, was made to correspond to the full range of thirty degrees. When the resistance of the instrument 33 was made twenty times that of the resistance 24 the voltage drop proportional to the range varied linearly within plus or minus one per cent, which was well within the permissible margin of error of the apparatus.

The computing device illustrated in Fig. 3 is operated by a radio locator like that shown in Fig. 1, and corresponding parts have been designated by the same numerals. This apparatus includes a correction for differences in the calculated altitude due to the earth's curvature and an arrangement whereby either of a plurality of scales on the indicating instrument may be selected automatically. The device as illustrated in Fig. 3 includes a linear resistance 35 connected directly across the constant voltage source of direct current and provided with a variable contact arm 36 connected through the coupling 28 to be moved in accordance with the range as determined by the arm 15. The voltage proportional to the range is impressed across a shunting resistance network including a calibrating resistance 37, a linear resistance 38 and two resistances 39 and 40 connected in parallel. The resistance 38 is provided with a movable contact arm 42 connected through the coupling 27 to be moved in accordance with the changes in the angle of elevation. The resistances 37 and 38 in series correspond to the resistances 30 and 23, respectively, in series in Fig. 1. It will be noted, however, that the order of the range and sine resistances has been changed so that the voltage impressed across the resistance 38 is proportional to the range and the output voltage of the resistance or potentiometer 38 is proportional to the product of the range and the sine of the angle of elevation. The load circuit for the potentiometer resistance 38 and corresponding to the resistance 24 in Fig. 1, includes an indicating instrument 43 connected to the arm 42 through a switch 44. The characteristics of the series of resistances including the resistance 38 and the load resistance including the instrument 43 are such as to provide a voltage varying approximately as the sine of angles up to about 30° in the same manner as the corresponding resistances of Fig. 1. The instrument 43 is provided with two indicating scales, the connection as shown with the switch 44 closed being employed when the lower or short range scale is being used. When it is desired to use the higher or long range scale the switch 44 is moved to engage a contact 45 and connect a resistance 46 in shunt across the instrument 43 and across a portion of a resistance 47 in series with the instrument 43, the portion of the resistance 47 being determined by the setting of an adjusting arm 48 which is the calibrating adjustment for the long range setting. The value of the resistance 46 is selected so that the resistance of the load circuit is substantially the same for both the high and low scale setting of the instrument. This relation holds quite closely even though the portion of resistance 47 in series with instrument 43 is adjusted for calibrating purposes because, as previously pointed out, the instrument resistance has a relatively high value. The resistance 37 is provided with a movable shunting contact arm 49 which is the calibrating adjustment for the short range setting. The operation of the switch 44 is effected automatically to change the range setting in a manner which will be described below.

The resistance 40 is provided in order to include in the reading of the instrument 43 the correction to account for differences in calculated altitude due to the curvature of the earth. The earth's curvature correction varies with the second power of the range and accordingly the resistance 40 is provided with a movable contact arm 50 which is connected by a mechanical coupling 51 to be moved simultaneously with the arm 36 in accordance with changes in the range of the distant object. The instrument 43 is connected between the arms 42 and 50 so that a desired small voltage proportional to the square of the range is added to the voltage across the selected portion of the resistance 38 which is impressed upon the instrument 43. The adjacent terminals of the resistances 38 and 40 are the points of zero reading of the sine and earth curvature correction respectively. The resistance 39 is provided with an adjusting arm 52 to calibrate the parallel circuit including the resistance 40 so that the voltage across the selected portion of the resistance 40 will be the required additional voltage proportional to the earth's curvature correction.

During the operation of apparatus such as that illustrated it is essential that readings of the several indicating instruments be available simultaneously and with a minimum adjustment of the circuits throughout the entire range of operation. For this reason it is desirable that the change from the lower scale to the higher scale of the instrument 43 be effected automatically, and so that the operator may read the correct scale directly without the necessity of referring to other indicators to determine which scale is being used. For this reason I provide a relay indicated generally at 54 which operates the switch 44 automatically whenever the reading of the instrument 43 reaches the upper limit of the lower scale and so that this switching operation is effected at the same point regardless of whether the change is a change from the lower scale to the upper or vice versa. Furthermore, in order to make sure that the operator takes his reading from the correct scale, the instrument 43 is provided with two scales marked in different colors, for example, red and blue. These scales may be arranged alongside one another or may be superposed. Red and blue pilot lights are provided to light the surface of the scale in such a manner that only one of the scales can be seen clearly at a time; for example, with a white background when the red light is turned on the scale marked in red becomes indistinct against the background and the scale marked in blue appears black and is easily readable and, conversely, when the blue light is turned on the blue scale becomes indistinct and the red scale appears black and is easily readable. When the scale is provided with a black background and the markings are colored red and blue the order of operation of the lights must be reversed, because the red markings appear when the red light is on and the blue markings when the blue light is on. In the arrangement illustrated the lower range scale which may, for example, be for altitudes up to 10,000 feet is intended to be marked in blue and a red pilot light 55 is turned on by a switch 56 whenever the arm 44 is connected as shown in the drawing for operation of the instrument 43 on its lower scale. When the arm 44 is moved to engage the contact 45 the relay simultaneously moves the arm 56 to engage a contact 57 thereby turning off the red light and turning on the blue light, indicated at 58. It will, therefore, be apparent that the operation of the relay automatically changes the readable scale of the indicating instrument in accordance with the change in the circuit connections.

The relay 54 is provided with an operating coil 60 connected to actuate the switch arms 44 and 56 through a suitable coupling device indicated at 61. Relays commonly operate in such a manner that the points at which the armatures pick up upon increased voltage or current are not the same as the points at which the armatures drop out upon decreased voltage or current. In order to realize the full advantage of the automatic scale changing it is desirable in the present circuit that the change from one scale to the other be effected at the same value of voltage or current regardless of whether the change is from the lower to the higher scale or vice versa. In order to insure operation of the relay 60 to change the instrument 43 from one scale to the other at the same value of voltage impressed across the instrument I provide an electron discharge device 62 connected in series with the relay coil 60 across the secondary of an alternating current transformer 63. The electron discharge device 62 is of the gas filled type and may, for example, be a type 2051 four-electrode tube. This tube has a characteristic such that for a given alternating current potential impressed between its anode and cathode it starts conducting at a precise value of control grid voltage and upon reduction of control grid voltage it stops conducting at the same point. Furthermore, when the device becomes conducting a high value of current flows through it. It will, therefore, be apparent that the device 62 may be made to cause the relay 60 to pick up and drop out at a precise value of voltage impressed on the control grid of the device thereby producing operation of the relay at the same value of voltage regardless of the rate or direction at which that voltage is approached through the adjustment of the apparatus. In the circuit as illustrated the device 62 includes a cathode 64, an anode 65, a control grid or electrode 66 and a shielding electrode 67. The control electrode 66 is connected to the arm 42 through a resistance 68 which may be of the order of one megohm and the cathode 64 is connected to a voltage divider 70 by an adjustable contact arm 71. This provides a cathode bias which is selected in accordance with the range at which it is desired to have the relay 54 operate. In the apparatus illustrated, for example, the arm 71 may be adjusted so that when the voltage impressed upon the control electrode 66 corresponds to the altitude of 10,000 feet the relay operates to shift the arms 44 and 56 from one reading position of the instrument to the other.

From the foregoing it is readily apparent that it is unnecessary for the operator to give any thought to the changeover from one scale of the instrument 43 to the other and that the changeover is always made at the same value of voltage appearing at the control arm 42.

The computing devices illustrated in both Figs. 1 and 3 are of simple construction and include linear resistance elements. These devices provide a direct indication of the height of a distant object which is available simultaneously with the indication of range obtained either by manual or automatic operation of a radio locating apparatus.

While I have described my invention in connection with a particular type of radio locating apparatus, other applications will readily be apparent to those skilled in the art. I do not, therefore, desire my invention to be limited to the particular arrangements shown and described, and I intend by the appended claims to cover all modifications within the spirit and scope of my invention.

What I claim as new and desire to secure by Letters Patent of the United States is:

1. An apparatus for computing values dependent upon the sines of angles within a predetermined range comprising a source of direct current having a linear resistance connected in shunt therewith, means including a second resistance for shunting a variable end portion lying within a predetermined fraction of said linear resistance, and means for adjusting the length of said end portion in direct proportion to the values of said angles, the length of said predetermined fraction and the relative values of said resistances for said range of angles being selected with respect to each other so that the voltage drop across said end portion varies substantially in direct proportion to the sines of said angles over said fraction.

2. An apparatus for computing the altitude of a distant object comprising a constant voltage source of direct current and a first linear resistance shunting said source, a second linear resistance arranged to shunt a variable end portion lying within a predetermined fraction of said first resistance, means for varying the length of said shunted portion directly in accordance with the angle of elevation of said object, the length of said predetermined fraction and the relative values of said resistances being selected so that the voltage drop in said portion varies substantially in direct proportion to the sine of said angle over said fraction, an instrument responsive to the voltage drop across a variable portion of said second resistance, and means for varying said portion of said second resistance in accordance with the range of said object whereby said instrument may be calibrated to indicate directly the altitude of said object.

3. An apparatus for computing the altitude of a distant object comprising a constant voltage source of direct current, a first linear resistance shunting said source, a second linear resistance having a value of the order of five times that of said first resistance and arranged to shunt variable lengths of an end portion of said first resistance, means for varying the length of said portion directly in accordance with the angle of elevation of said object whereby the voltage drop across said portion varies as the sine of said angle, an instrument responsive to the voltage drop across a variable portion of said second resistance, and means for varying said portion of said second resistance in proportion to the range of said object whereby said instrument may be calibrated to indicate the altitude of said object.

4. Apparatus for computing the altitude of distant objects having a maximum angle of elevation of the order of thirty degrees comprising a constant voltage source of direct current, a first linear resistance shunting said source, a second linear resistance having a value of the order of four times that of said first resistance and arranged to shunt variable lengths of an end portion of said first resistance, said end portion comprising substantially forty per cent of said first resistance, means arranged to move the point of contact of said resistances for varying the shunted length of said end portion directly in accordance with the angle of elevation of said object whereby the voltage drop across said shunted portion varies as the sine of said angle of elevation, an instrument responsive to the voltage drop across a portion of said second resistance, and means for varying said portion of said second resistance in proportion to the range of said object whereby said instrument may be calibrated to indicate the altitude of said object.

5. An apparatus for computing the altitude of a distant object comprising a constant voltage source of direct current, a first linear resistance connected across said source, a second linear resistance, means for connecting said second resistance in a load circuit across a variable portion of said first resistance, an indicating instrument, means for connecting said indicating instrument in a load circuit across a variable portion of said second resistance, means for selecting the variable portion of one of said resistances in accordance with the range of the distant object, and means for selecting the variable portion of the other of said resistances directly in accordance with the angle of elevation of said object, the resistance of the variable portion of said other resistance with respect to the total resistance thereof and the resistance of the load across said variable portion of said other resistance being selected so that the voltage drop in the variable portion of said other resistance varies in proportion to the sine of the angle of elevation.

6. An apparatus for computing the altitude of a distant object comprising a constant voltage source of direct current, a first resistance and a movable contact arm associated therewith, means for moving said arm in accordance with the range of the distant object to select a portion of said resistance having a voltage drop proportional to said range, second and third resistances electrically connected with said portion whereby the voltage drops across said resistances vary in proportion to the range of said object, means including an indicating instrument and a movable contact arm for said second resistance for providing a voltage proportional to the range and the sine of the angle of elevation of the distant object, said arm of said second resistance being moved in proportion to the angle of elevation of the object, and means including an adjustable arm associated with said third resistance for providing a voltage proportional to the earth's curvature correction corresponding to the range of the object and for adding said correction to the voltage drop across said second resistance.

7. An apparatus for computing the altitude of a distant object comprising a constant voltage source of direct current, a first resistance connected across said source, second and third resistances connected in series and shunting a variable portion of said first resistance, an electric indicating instrument connected in shunt to variable adjacent portions of said second and third resistances in series, means for adjusting the variable portions of said first and third resistances in accordance with the range of the distant object, means for adjusting the variable portion of said second resistance in accordance with the angle of elevation of the object, said second resistance and the resistance of said instrument being of such relative proportions that the voltage drop across the shunted portion of said second resistance varies as the sine of the angle of elevation, and means for calibrating said third resistance to provide a voltage drop in the shunted portion thereof proportional to the earth's curvature correction at the range of the distant object whereby said instrument may be calibrated to indicate directly the altitude of the distant object.

8. An apparatus for computing the altitude of a distant object comprising a constant voltage source of direct current, first, second, and third linear resistances each having an adjustable contact associated therewith, said first resistance being connected across said source and said second and third resistances being connected in series and between one end of said first resistance and its adjustable contact, an electric indicating instrument connected between the contacts of said second and third resistances, means for selectively moving the contacts of said first and third resistances simultaneously in accordance with the range of the distant object whereby the voltage drops across the selected portions of said first and third resistances are respectively proportional to the first and second powers of the range, means for selectively moving the contact of said second resistance in accordance with the angle of elevation of the object, the relative values of the resistance of said instrument and of said second resistance being so proportioned that the voltage drop across the selected portion of said second resistance varies in accordance with the product of the range and the sine of the angle of elevation, and means for calibrating said third resistance to provide a voltage drop proportional to the earth's curvature correction for the range of the object.

GEORGE W. FYLER.

REFERENCES CITED

The following references are of record in the file of this patent:

UNITED STATES PATENTS

| Number | Name | Date |
| --- | --- | --- |
| 1,257,514 | Meyer | Feb. 26, 1918 |
| 1,345,706 | Routin | July 6, 1920 |
| 1,542,534 | Schneider | June 16, 1925 |
| 1,655,276 | Lichtscheindl | Jan. 3, 1928 |
| 1,949,592 | Macadie | May 22, 1934 |
| 1,847,105 | Spitzglass | Mar. 1, 1932 |
| 2,070,178 | Pottinger, Jr. et al. | Feb. 9, 1937 |
| 2,080,186 | Reymond | May 11, 1937 |
| 2,313,208 | Steklik | Mar. 9, 1943 |